United States Patent
Griffin et al.

(10) Patent No.: US 10,977,066 B2
(45) Date of Patent: Apr. 13, 2021

(54) VIRTUAL MACHINE TO CONTAINER CONVERSION AND OPTIMIZATION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

(*) Notice: Subject to any disclaimer, the term of this patent is extended or adjusted under 35 U.S.C. 154(b) by 182 days.

(21) Appl. No.: 15/947,260

(22) Filed: Apr. 6, 2018

(65) Prior Publication Data

US 2019/0310872 A1    Oct. 10, 2019

(51) Int. Cl.
  G06F 9/455    (2018.01)
  G06F 9/54     (2006.01)
  G06F 8/71     (2018.01)

(52) U.S. Cl.
  CPC ........... G06F 9/45558 (2013.01); G06F 8/71 (2013.01); G06F 9/544 (2013.01); *G06F 2009/4557* (2013.01); *G06F 2009/45562* (2013.01)

(58) Field of Classification Search
  CPC ........ G06F 9/45558; G06F 9/544; G06F 9/54; G06F 9/5077; G06F 9/5038; G06F 9/4868; G06F 2009/45562; G06F 2009/4557; G06F 8/433; G06F 8/63; G06F 8/71
  See application file for complete search history.

(56) References Cited

U.S. PATENT DOCUMENTS

| | | | |
|---|---|---|---|
| 7,313,793 B2 | 12/2007 | Traut et al. | |
| 8,191,063 B2 | 5/2012 | Shingai et al. | |
| 8,473,557 B2 | 6/2013 | Ramakrishnan et al. | |
| 9,122,562 B1 | 9/2015 | Stickle | |
| 9,201,704 B2 | 12/2015 | Chang et al. | |
| 9,462,427 B2 | 1/2016 | Patel | |
| 9,367,305 B1 | 6/2016 | Kumar et al. | |
| 9,582,268 B2 | 2/2017 | Kumar et al. | |
| 10,346,190 B1 | 7/2019 | Sharifi Mehr | |

(Continued)

OTHER PUBLICATIONS

Marks, Mano, "IMAGE2DOCKER: A New Tool for Prototyping Windows VM Conversions", Sep. 28, 2016, https://blog.docker.com/2016/09/image2docker-prototyping-windows-vm-conversions/, 6 pages.

(Continued)

*Primary Examiner* — Emerson C Puente
*Assistant Examiner* — Zhi Chen
(74) *Attorney, Agent, or Firm* — Lowenstein Sandler LLP

(57) ABSTRACT

Technology for analyzing a target machine (e.g., virtual machine or physical machine) and converting the services of the target machine to one or more container images that can be run using operating system level virtualization. An example method may include: receiving, by a processing device, data of a virtual machine, the data indicating a configuration of the virtual machine and a set of processes executed by the virtual machine; identifying, by the processing device, computer code of a first process of the set of processes executed by the virtual machine; analyzing the computer code to detect a link between the first process and a second process of the set of processes; and building a container image in view of the data of the virtual machine and the identified link, wherein the container image comprises the computer code of the first process and computer code of the second process.

20 Claims, 8 Drawing Sheets

(56) References Cited

U.S. PATENT DOCUMENTS

| | | | |
|---|---|---|---|
| 10,540,192 B1 | 1/2020 | Isdal | |
| 2014/0095821 A1* | 4/2014 | Yang | G06F 21/53 |
| | | | 711/162 |
| 2014/0229951 A1 | 8/2014 | Zhang | |
| 2016/0380916 A1 | 12/2016 | Gnaneswaran et al. | |
| 2017/0052771 A1 | 2/2017 | Chen et al. | |
| 2018/0026911 A1 | 1/2018 | Anholt | |
| 2018/0225155 A1 | 8/2018 | Watt | |
| 2020/0034167 A1 | 1/2020 | Parthasarathy et al. | |

OTHER PUBLICATIONS

Lubin, Eric, VM2Docker: Automating the Conversion from Virtual Machine to Docker Container, Massachusetts Institute of Technology, 2015, 68 pages.

Supreeth S, Shobha Biradar, "Scheduling Virtual Machines for Load Balancing in Cloud Computing Platform", International Journal of Science and Research (IJSR), India Online ISSN: 2319-7064; vol. 2 Issue 6, Jun. 2013, 5 pages.

Rusian Synytsky, "Migration from VMs to Containers", Jelastic Blog, Oct. 11, 2016, 9 pages.

USPTO, Office Action for Application No. 15/975,158, dated Jun. 8, 2020.

USPTO, Office Action for Application No. 15/975,158, dated Oct. 2, 2020.

\* cited by examiner

VIRTUAL MACHINE TO CONTAINER CONVERSION AND OPTIMIZATION

TECHNICAL FIELD

The present disclosure is generally related to migrating computing services from a hardware level virtualization platform using virtual machines to an operating system level virtualization platform using containers, and is more specifically related to analyzing a virtual machine running multiple processes to convert the multiple processes to run within one or more containers.

BACKGROUND

Modern data centers may support different types of virtualization technology that can be used to consolidate the data center infrastructure and increase operational efficiencies. The virtualization technology may include hardware level virtualization, operating system level virtualization, other virtualization, or a combination thereof. The hardware level virtualization may involve a hypervisor (e.g., virtual machine monitor) that emulates portions of a physical system and manages one or more virtual machines. Each virtual machine may have its own guest operating system kernel that relies on features of a kernel of the hypervisor. In contrast, operating system level virtualization may include a single operating system kernel that manages multiple isolated virtual containers. Each virtual container may share the kernel of the underlying operating system without requiring its own kernel. Avoiding separate kernels for each container may reduce computational overhead. Data centers may therefor benefit by converting the services running on a virtual machine to run within one or more containers. The process to convert the virtual machine services to containers is traditionally a manual process requiring in-depth knowledge of the virtual machine and service configurations.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
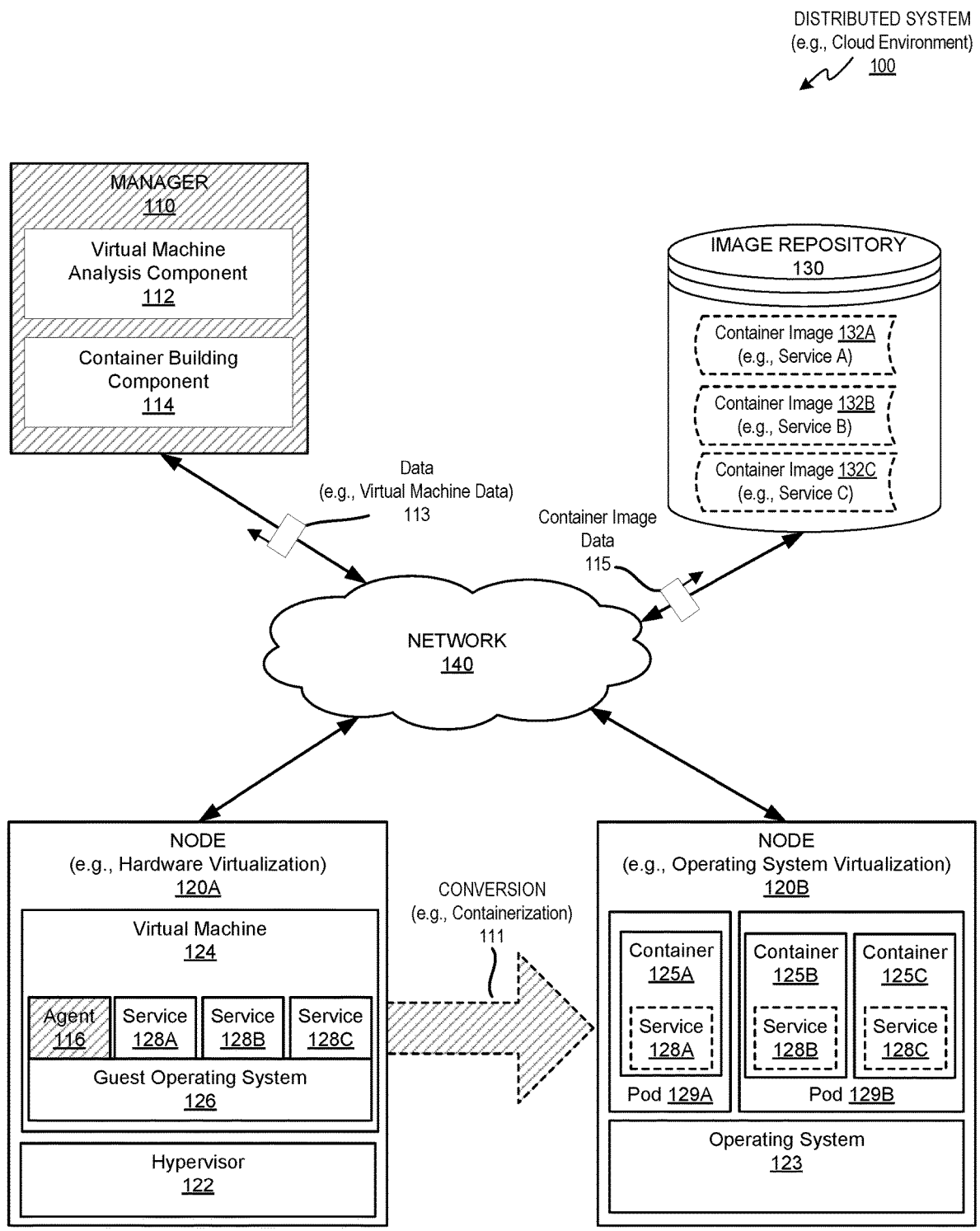
FIG. 1 depicts a high-level block diagram of an example distributed system, in accordance with one or more aspects of the present disclosure.

Modern data centers provide services using a combination of physical machines and virtual machines. A single virtual machine may execute multiple processes in order to provide the one or more services. Converting the services run by the virtual machine to be run within containers often involves the intervention of an IT administrator. The IT administrator may provide details about a guest operating system managing the services and identify which processes correspond to the services being converted to run in containers. The virtual machine may execute hundreds of processes and only a small subset of the processes may need to be converted to provide the services. Relying on an IT administrator to identify the processes that correspond to a service and to identify the dependencies of the processes may be an error prone and time-consuming task.

Aspects of the present disclosure address the above and other deficiencies by providing technology to convert services from executing on a virtual machine using hardware level virtualization to executing within containers using operating system level virtualization. In one example, the technology disclosed herein may involve receiving data indicating a configuration of a virtual machine and a set of processes executed by the virtual machine. The technology may analyze the data received from the virtual machine and may configure one or more container images to execute the services provided by the virtual machine. The set of processes may be associated with data common to the virtual machine's operating system and data specific to the one or more services. The data common to the operating system may be filtered out and the subset of data specific to the services may be used to build the one or more container images. The data specific to the services may identify a subset of processes that may be analyzed to identify one or more links. The analysis of the subset of processes may involve identifying and analyzing computer code (e.g., source code or executable code) for each process to determine one or more links. The links may include dependencies (e.g., execution dependencies), an inter-process communication, shared memory, shared data structures, other links, or a combination thereof. The technology may determine in view of the virtual machine data and identified links the content of the virtual machine and corresponding processes that should be combined into the same container and content and processes that can be separated into different containers.

The technology may then build and optimize one or more container images so that the services can be executed within containers using operating system level virtualization. The container images may be optimized to include one or more layers. The number of layers associated with a container image may be determined during or after the container images are built and may depend on the data of the virtual machine and on the links between the services and processes executing on the virtual machine. A layer may represent a particular version of a filesystem that is accessible to a process executing within a container. In one example, the version of the filesystem may correspond to one or more packages that the service relies on. Each layer may be incremental and inheritable such that content of a lower layer may be present at a higher layer much like a newer version of filesystem may include content of a previous version of the filesystem. Layering may be advantageous because content of a layer (e.g., common layer) may be loaded once and shared across multiple containers. Without layering, each container may include its own copy of content and the underlying operating system may store multiple copies of the same content. The technology disclosed herein may select an optimal number of layers based one or more of the links between the processes executed by the virtual machine.

The systems and methods described herein include technology that enhances the ability to convert services of a virtual machine to one or more container images that support operating system level virtualization. In particular, aspects of the present disclosure may enable multiple services executing on a virtual machine to be converted to one or more containers. The conversion process may receive input identifying one or more virtual machines and may iterate through each virtual machine and migrate the services of each virtual machine to corresponding containers. This may reduce input required by an IT administrator and enable automatic migration across virtualization platforms within a data center or across data centers. Aspects of the present disclosure may also reduce the computing resources consumed by the containerized services by optimizing the layering of the container images. The technology may determine the number of layers as well as the content of the layers in order to optimize the amount of content shared across layers of a container or across different containers. This may reduce the storage resources (e.g., disk and memory space), processing resources (e.g., processor cycles), Input Output (I/O) resources, other computing resources, or a combination thereof.

Various aspects of the above referenced methods and systems are described in details herein below by way of examples, rather than by way of limitation. The examples provided below discuss a computing environment where the services are executed by virtual machines, but other examples may include services that are executed on physical machines that is absent virtual machines (e.g., absent hardware level virtualization). In which case, all instances of virtual machine may correspond to a target machine (e.g., physical target machine) and the services executing on the physical target machine may be containerized to run using operating system level virtualization.

FIG. 1 illustrates an example distributed system 100 in which implementations of the disclosure may operate. The distributed system 100 may include a manager 110, a plurality of nodes 120A, 120B, and an image repository 130 coupled via a network 140. Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Manager 110 may be hosted by a computing device and may include one or more computer programs executed by the computing device for centralized management of distributed system 100. In one implementation, the manager 110 may comprise various interfaces, including administrative interface, reporting interface, and/or application programming interface (API) to communicate with nodes 120A-B, as well as to user portals, databases, directory servers and various other components, which are omitted from FIG. 1 for clarity. Manager 110 may interact with one or more computing devices to perform a conversion 111. Conversion 111 may be the same or similar to a containerization of one or more services (e.g., processes) running on a target machine (e.g., virtual machine or physical machine) to one or more container images that can be run using operating system level virtualization. In the example shown in FIG. 1, manager 110 may include a virtual machine analysis component 112 and a container building component 114. Virtual machine analysis component 112 may analyze data from a virtual machine to identify a configuration of the virtual machine. In one example, virtual machine analysis component 112 may receive data 113 (e.g., configuration data) from an agent 116 that has access to content of the virtual machine. Virtual machine analysis component 112 may analyze data 113 to identify a set of processes executing on the virtual machine that provide one or more services. Container building component 114 may build one or more container images (e.g., container image data 115) in view of the data 113 of the virtual machine. The one or more container images may collectively include the services executed by the virtual machine. The features of manager 110 are discussed in more detail in regards to FIG. 3.

Agent 116 may be a computer program that inspects the virtual machine and provides data about the virtual machine to manager 110. Agent 116 may execute as one or more user space processes, kernel processes, or a combination thereof on any node with access to executable content of the virtual machine. The node that execute agent 116 may be the same node that is executing the virtual machine (e.g., node 120A) or a different node. Agent 116 may be installed within or managed by a virtual machine, hypervisor 122, a host operating system, other computer program, or a combination thereof. The features of agent 116 are discussed in more detail in regards to FIG. 2. In the example shown in FIG. 1, agent 116 may execute as one or more processes within virtual machine 124 and may transmit data of virtual machine 124 to manager 110 via node 120A.

Nodes 120A-B may comprise one or more computing devices with one or more processors communicatively coupled to memory devices and input/output (I/O) devices, as described in more details herein below with references to FIG. 7. Although nodes 120A-B comprise a computing device, the term "node" may refer to a computing device (e.g., physical machine), a virtual machine, or a combination thereof. Each of the nodes 120A-B may provide one or more levels of virtualization such as hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Node 120A node may provide hardware level virtualization by running a hypervisor 122 that provides hardware resources to one or more virtual machines 124. Hypervisor 122 may be any program or combination of programs and may run directly on the hardware (e.g., bare-metal hypervisor) or may run on or within a host operating system (not shown). The hypervisor may manage and monitor various aspects of the operations of the computing device, including the storage, memory, and network interfaces. The hypervisor may abstract the physical layer features such as processors, memory, and I/O devices, and present this abstraction as virtual devices to a virtual machine 124 executing a guest operating system 126.

Guest operating system 126 may be any program or combination of programs that are capable of managing computing resources of virtual machine 124 and/or node 120A. Guest operating system 126 may include a kernel comprising one or more kernel space programs (e.g., memory driver, network driver, filesystem driver) for interacting with virtual hardware devices or actual hardware devices. In one example, guest operating system 126 may include Linux®, Solaris®, Microsoft Windows®, Apple Mac®, other operating system, or a combination thereof. Guest operating system 126 may manage the execution of multiple processes to provide services 128A-C.

Service 128A-C may be any computing services that can receive, transmit, or processes requests and perform one or more computing tasks in view of the requests. Each service may include one or more processes that are executed on node 120A and each of the processes may function as a client process, a server process, or a combination thereof. The processes may execute on a single virtual machine or spread across multiple machines. In one example, services 128A-C may include one or more web services, database services, filesystem services, networking services, messaging services, load balancing services, clustering services, configuration management services, other services, or a combination thereof.

Node 120B may provide operating system level virtualization by running a computer program that provides computing resources to one or more containers 125A-C. Operating system level virtualization may be implemented within the kernel of operating system 123 and may enable the existence of multiple isolated containers. In one example, operating system level virtualization may not require hardware support and may impose little to no overhead because programs within each of the containers may use the system calls of the same underlying operating system 123. This may enable node 120B to provide virtualization without the need to provide hardware emulation or be run in an intermediate virtual machine as may occur with hardware level virtualization. Operating system level virtualization may provide resource management features that isolate or limit the impact of one container (e.g., container 125A) on the resources of another container (e.g., container 125B or 125C).

The operating system level virtualization may provide a pool of computing resources that are accessible by container 125A and are isolated from one or more other containers (e.g., container 125B). The pool of resources may include filesystem resources (e.g., particular volumes), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of filesystem limits, disk limits, input/out (I/O) limits, memory limits, CPU limits, network limits, other limits, or a combination thereof.

Operating system 123 may include an operating system virtualizer that may provide containers 125A-C with access to computing resources. The operating system virtualizer may wrap one or more processes (e.g., of a particular service) in a complete filesystem that contains the code, runtime, system tools, system libraries, and other data present on the node that can be used by the processes executing within the container. In one example, the operating system virtualizer may be the same or similar to Docker® for Linux® or Windows®, ThinApp® by VMWare®, Solaris Zones® by Oracle®, other program, or a combination thereof that automates the packaging, deployment, and execution of applications inside containers.

Each of the containers 125A-C may refer to a resource-constrained process space of node 120 that can execute functionality of a program. Containers 125A-C may be referred to as a user-space instances, a virtualization engines (VE), or jails and may appear to a user as a standalone instance of the user space of operating system 123. Each of the containers 125A-C may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pods 129A and 129B may be data structures that are used to organize one or more containers 125A-C and enhance sharing between containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 120B. In another example, the containers associated with a particular pod may be located on different nodes that are on the same or different physical machines.

Image repository 130 may be any data store that is capable of storing one or more images, storage metadata, and storage lease information. The images may include container images, virtual machine images, disk images, other images, or a combination thereof. Image repository 130 may include block-based storage devices, file-based storage devices, other storage device, or a combination thereof. Block-based storage devices may provide access to consolidated block-based (e.g., block-level) data storage and may include one or more devices (e.g., Storage Area Network (SAN) devices). Block-based storage devices may be accessible over a network and may appear to an operating system of a computing device as locally attached storage. File-based storage devices may provide access to consolidated file-based (e.g., file-level) data storage using one or more data storage devices (e.g., Network Attached Storage (NAS) devices) that may be accessible over a network. In one example, a secondary storage with image repository 130 may employ block-based storage and the images, storage metadata, and storage lease may be provided by respective logical volumes. In another example, the secondary storage with image repository 130 may employ file-based storage and the images, storage metadata, and storage lease may be provided by one or more respective files. In the example shown in FIG. 1, image repository 130 includes container images 132A-C.

Container images 132A-C may include one or more computer programs along with a filesystem that contains the computer code, runtime, system tools, system libraries, other data, or a combination thereof to support the execution of a service within a container on node 120B. The container images 132A-C may not include an operating system but may be loaded and run by an operating system virtualizer that is part of operating system 123 of node 120B. Each of the container images 132A-C may include one or more data structures for storing and organizing information that may be used by node 120B to provide a computing service. The information within container images 132A-C may indicate the state of the image and may include computer code (e.g., machine code), configuration information (e.g., settings), or content information (e.g., file data, record data). Each of the container images 132A-C may be capable of being loaded onto node 120 and may be executed to provide one or more services.

Figure 2:
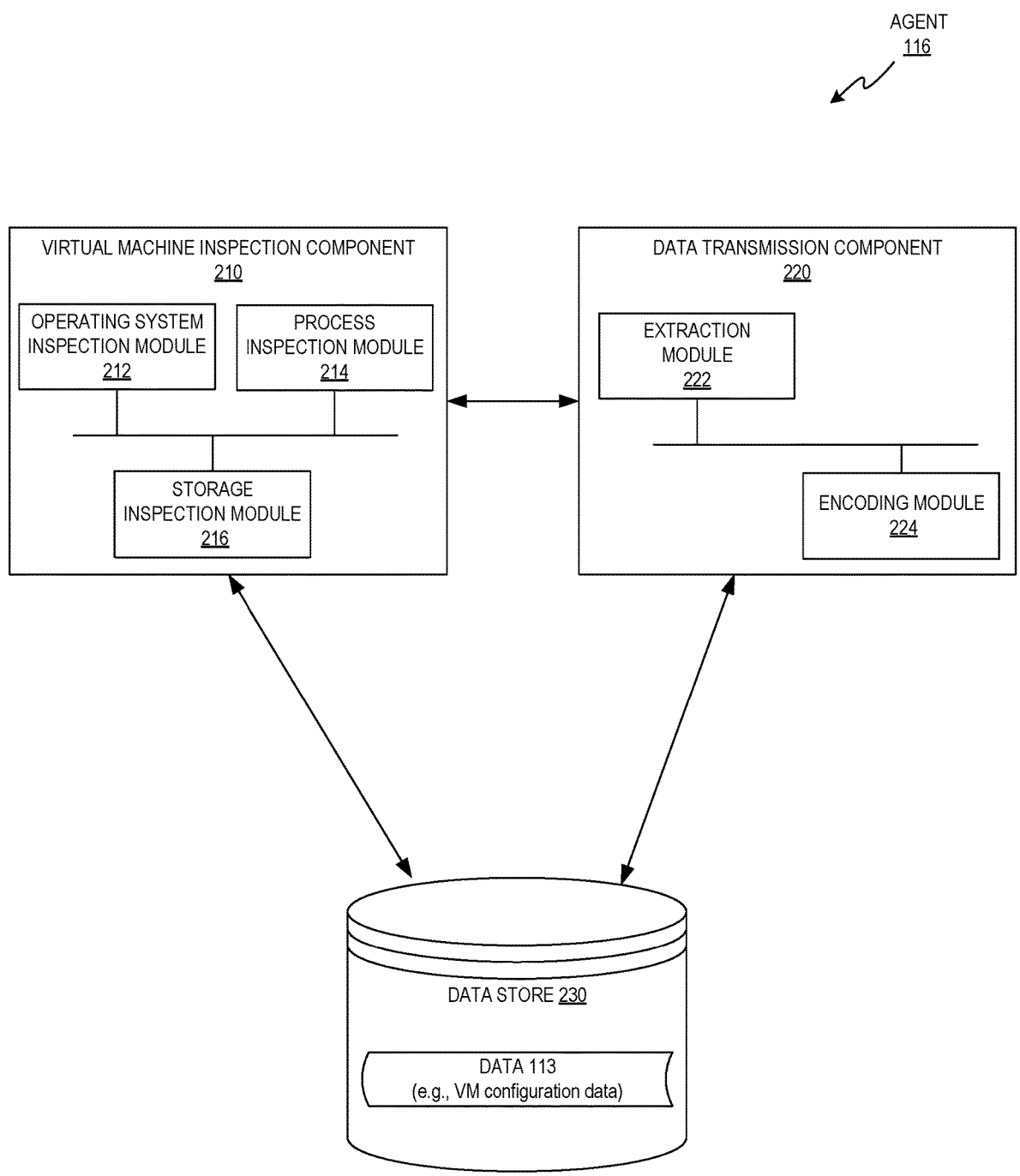
FIG. 2 depicts a block diagram of an example agent for inspecting a target machine (e.g., virtual machine or physical machine), in accordance with one or more aspects of the present disclosure.
Figure 3:
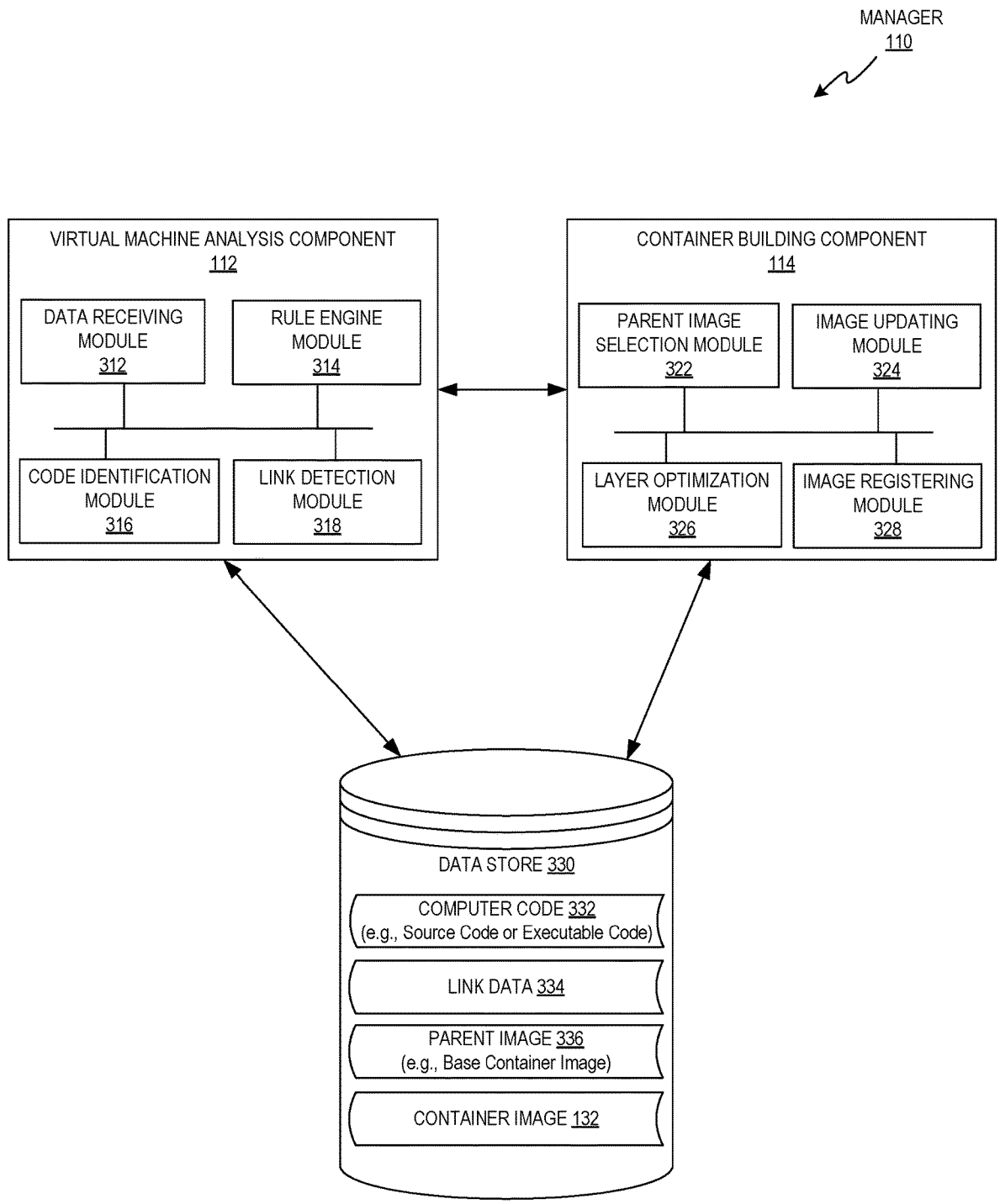
FIG. 3 depicts a block diagram of an example manager for building a container image in view of data of the target machine (e.g., virtual machine or physical machine), in accordance with one or more aspects of the present disclosure.

FIGS. 2 and 3 are block diagrams illustrating example components and modules of agent 116 and manager 110 respectively, in accordance with one or more aspects of the present disclosure. Agent 116 may be the same or similar to agent 116 of FIG. 1 and manager 110 may be the same or similar to manager 110 of FIG. 1. The components, modules, or features discussed in regards to agent 116 and manager 110 may be consolidated to the agent 116, consolidated to the manager 110, or be spread in any manner across both entities. For example, features discussed below in regards to manager 110 may be executed by agent 116 or vice versa.

Referring to FIG. 2, Agent 116 may include one or more computer programs that are capable of accessing the virtual machine. The one or more computer programs may be installed into the guest operating system (e.g., as an application or driver), the virtual machine (e.g., as an emulation or virtualization feature), a hypervisor, a host operating system, or a combination thereof. The installation of the agent 116 may be initiated by the device executing the manager 110 or by a user (e.g., IT administrator). Agent 116 may access content of the virtual machine while the virtual machine is active (e.g., an executing virtual machine image), while the virtual machine is inactive (e.g., dormant virtual machine image), or a combination thereof. In one example, agent 116 may be executed by the virtual machine that is being inspecting or by another computing device with access to the virtual machine being inspected. In the example, shown in FIG. 2, agent 116 may include a virtual machine inspection component 210, a data transmission component 220, and a data store 230.

Virtual machine inspection component 210 may enable agent 116 to inspect the virtual machine to identify data indicating a configuration of the virtual machine. The configuration of a virtual machine may relate to data of the guest operating system, running processes, filesystem, other data, or a combination thereof. The data may include operational data that relates to an operational state (e.g., transient state, changing state) of the virtual machine and one or more processes or may relate to non-operational data such as settings of the virtual machine or guest operating system. The data may include ephemeral data that may correspond to processes while they are being executed and may cease to exist when the processes are shut down.

The modules of virtual machine inspection component 210 may gather the configuration data by executing one or more operations. The operations may be any command, instruction, procedure, function, executable, utility, other action, or a combination there of. The operation may be specific to the guest operating system or may be generic to one or more guest operating systems. The operation may return configuration data as textual data, binary data, other data or a combination hereof. The data may be in the form of one or more strings, streams, lists, tables, files, records, other data structures, or a combination thereof. In one example, virtual machine inspection component 210 may execute operations that are the same or similar to a table of processes (TOP) operation that lists running processes, a network mapper (NMAP) operation that enumerates open ports, memory (MEM) operation that provides memory use details, other operation, or a combination thereof.

Virtual machine inspection component 210 may also or alternatively execute operations to gather data using a configuration pseudo-filesystem. The configuration pseudo-filesystem may represent process information, kernel information, system information, other information, or a combination thereof using a hieratically organized directory structure. This may enable virtual machine inspection component 210 to use traditional filesystem operations to navigate the configuration pseudo-filesystem to gather data of virtual machine. For example, the configuration pseudo-filesystem may be mapped to a mount point and one or more of the directories may correspond to particular processes (e.g., particular PIDs). In one example, the configuration pseudo-filesystem may be the same as the Unix or Linux based proc filesystem (ProcFS), system filesystem (SysFS), other filesystem, or a combination thereof. In one example, virtual machine inspection component 210 may gather data from the virtual machine using an operating system inspection module 212, a process inspection module 214, and a storage inspection module 216.

Operating system inspection module 212 may analyze the operating system to identify features of the operating system. The features of the operating system may include operating system type data, release data, version data, build data, patch data, other operating system indication data, or a combination thereof. It may also indicate one or more programs that have been installed on the virtual machine. The programs may have been installed by an end user (e.g., IT administrator) or come pre-installed with the operating system from the operating system developer (e.g., Microsoft®) or computer manufacturer (e.g., IBM®, Dell®, HP®). The programs may be standalone programs or may be included within one or more packages.

Process inspection module 214 may enable agent 116 to inspect the virtual machine to identify configuration data that indicates the processes running on the virtual machine and the operational status of the processes (e.g., operational data). The configuration data gathered by process inspection module 214 may include any information associated with a process. The information may include one or more process identifiers (e.g., PID), process computer code (e.g., source code, interpretable code, intermediate code, object code, binary code, executable code), process entry points (command line parameters, initialization parameters), process working directories, process networking identifier (e.g., ports, sockets), process tokens (e.g., security token, key, identifier), process credentials (e.g., username and passcode), process owner (e.g., user or system account), process priority, other information, or a combination thereof.

Storage inspection module 216 may inspect the persistent storage associated with the virtual machine. This may involve one or more operations to determine data about the filesystem or content stored by the filesystem. The data about the filesystem may include filesystem type data, filesystem version data, other data, or a combination thereof. The data stored by the filesystem may include the data associated with one or more filesystem objects. Storage inspection module 216 may gather data by executing one or more operations to search content of one or more filesystems of the virtual machine. The operations may identify content of the filesystem, which may include files, directories, filesystem metadata, other data, or a combination thereof. In one example, the operations may include filesystem navigation operations (e.g., change directory (CD) command) as well as reading, writing, execution, other operations, or a combination thereof.

Data transmission component 220 may access data identified by virtual machine inspection component 210 and may process the data prior to transmitting it to manager 110. In one example, data transmission component 220 may include an extraction module 222 and an encoding module 224.

Extraction module 222 may enable agent 116 to analyze the configuration data identified by the above inspection modules and extract portions of the data for use by manager 110. Extraction module 222 may execute one or more operations that extract data, filter-out data, segment data, remove data, modify data, add data, create data, other operation, or a combination thereof. In one example, the configuration data may include a set of processes (e.g., list of running processes) and extraction module 222 may modify the set to remove (e.g., filter out) processes that are associated with the operating system (e.g., native kernel processes). The remaining processes may include processes that are associated with the services installed on the virtual machine. One or more of the features of extraction module 222 may be performed by the agent 116, manager 110, or a combination thereof.

Encoding module 224 may encode the data of the virtual machine into a message that can be transmitted to manager 110. The encoding may include compression, encryption, other operation, or a combination thereof. The encoding may effect the configuration data, extracted data, other data, or a combination thereof and may result in encoded data. The encoded data may then be transferred to the manager over one or more connections and the connections may include connections between nodes on the same physical device or between nodes on different devices. The connections may also or alternatively include network connections and the encoded data may be sent over a network to a separate computing device executing the manager.

Referring to FIG. 3, components and modules of manager 110 may be illustrated as a block diagram, in accordance with one or more aspects of the present disclosure. Manager 110 may be the same or similar to manager 110 of FIG. 1 and may include a virtual machine analysis component 112, a container building component 114, and a data store 330.

Virtual machine analysis component 112 may analyze and processes the data of the virtual machine that was identified by the agent. In one example, virtual machine analysis component 112 may include a data receiving module 312, a rules engine module 314, a code identification module 316, and a link detection module 318.

Data receiving module 312 may enable manager 110 to receive data of the virtual machine from the agent. The data of the virtual machine may indicate the configuration of the virtual machine and a set of processes executed by the virtual machine. The set of processes comprises one or more of a web server process, a database process, a filesystem process, a user authentication process, or an electronic mail process.

Rules engine module 314 may analyze the data received from the agent in view of one or more rules. The rules engine may analyze the set of processes in view of a set of rules. The rules may be derived from an IT administrator, service designer, end user, other source, or a combination thereof. The rules may be stored in a data structure (e.g., a CSV format). The rules may enable manager 110 to remove operating system specific processes that are already included within the operating system managing the containers and do not need to be executed within a container. Rules engine module 314 may also enable manager 110 to identify transient services (definable in the rules) that execute on the virtual machine but are identified in the rules as not being candidates for conversion. Rules engine module 314 may provide an ordered priority of the candidate services based on the rules provided, which may be accessed by code identification module 316.

Code identification module 316 may analyze the set of processes that are candidates for conversion and identify computer code 332 associated with the candidate processes. Computer code 332 may include any code associated with one or more of the processes and may include source code, executable code, other code, or a combination thereof. The source code may include human readable computer code that is in a textual form. The source code may be subsequently compiled, linked, interpreted, other action, or a combination thereof prior to being executed by the virtual machine or within a container. The executable code may include machine-readable code that can be directly executed by a machine or indirectly executed by a machine (e.g., intermediate code).

Code identification module 316 may identify the computer code in view of the configuration data received from the agent. In one example, the configuration data may include some or all of the computer code. In another example, the configuration data may indicate a location where some or all of the computer code is accessible (e.g., storage location). The location may be local to the virtual machine (e.g., on same physical device) or may be remote from the virtual machine on a storage device that is accessible over a network. In either example, code identification module 316 may access the computer code and make it available to link detection module 318.

In one example, code identification module 316 may access the data related to the pseudo-filesystem (e.g., /proc) to locate the computer code. This may involve accessing data available at /proc/{PID}/cmdline to derive a location (e.g., a filesystem path) used to start a respective process. In another example, this may involve determining the current working directory of the code (e.g., available at /proc/{PID}/cwd), which may be used to derive the base folder from which the code running was executed from and therefor enable the discovery of the working directory of the source code. In another example, code identification module 316 may access search data relating to open files that the respective process is using. This may be accomplished by examining the results of a call to /proc/{PID}/fd. Any combination of data available at the pseudo-filesystem (e.g., /proc) may be used to locate the computer code of the one or more processes being converted.

Link detection module 318 may analyze the computer code and the configuration data to detect links between a candidate process and other content of the virtual machine. The links of a process may be detected during a static analysis of the computer code or by a runtime analysis of the computer code and may be stored as link data 334. The links may be based on one or more dependencies, communications, other relationship, or a combination thereof. The dependencies may include code building dependences (e.g., compiler dependences, linking dependencies), runtime executable dependences (e.g., package, library, or function dependencies), data dependencies (e.g., settings), account dependency (e.g., particular account, credentials, or token), content dependence (e.g., file or record), other dependency relationship, or a combination thereof. A link may also be detected based on inter-process communication of a process with one or more of the other candidate processes or with another process executing on the virtual machine or other machine. The inter-process communication may occur over any communication channel and may include or be based on one or more inter-process interrupts (e.g., traps), shared files, shared memory, interrupts, message passing, message queues, pipes, sockets, other signal, or a combination thereof.

Container building component 114 may access the data of virtual machine analysis component 112 and use the data to build one or more container images that collectively include the services (e.g., processes) provided by the virtual machine. In the example shown in FIG. 3, container building component 114 may include a parent image selection module 322, an image updating module 324, a layer optimization module 326, and an image registering module 328 that are configured to form container image 132.

Container image 132 may include the computer code of one or more processes of a particular service along with filesystem data that contains the runtime, system tools, system libraries, other data, or a combination thereof to support the execution of the service within a container. Container image 132 may be capable of being initiated by a computing device (e.g., node) and may be loaded to perform one or more processes of a service. Container image 132 may be absent (free, missing, without) operating system or kernel libraries but may be loaded and run by an operating system virtualizer that is part of an existing operating system. Container image 132 may include one or more data structures for storing and organizing information in a format that can be interpreted by the operating system virtualizer and executed by a processing device to provide the service.

The format of container image 132 may be based on any open standard, proprietary format, other format, or a combination thereof. The information within container image 132 may indicate the state of the image and may include executable information (e.g., machine code), configuration information (e.g., settings), or content information (e.g., file data, record data). In one example, container image 132 may include textual data that indicates the name, tag, and architecture of the image and may also include one or more data structures representing one or more layers of the image. The data structures may include schema version data, index data (e.g., digest data or hash data) of filesystem objects, and history data indicating one or more parent or child layers. In one example, the format may be based on a docker image manifest (e.g., docker image manifest V2, Schema 1), an open container initiative (OCI) specification, other container format, or a combination thereof.

Container image 132 may represent a chain of layers that when run as a container includes one or more copy-on-write (COW) volumes (which may also be referred to as "layers"). From the perspective of the container, the layers may appear as a single filesystem. Initially, the topmost layer may be a raw or COW volume, which may be made read-only before the initialization of the container image as a container. An attempt to write to the filesystem by the container may modify the image or may trigger adding a new COW volume ("layer") to the volume chain. The top layer (e.g., new volume) may store disk blocks or files that have been modified or newly created by the container processes after the previous volume ("layer") has been made read-only. One or more volumes may be added to the volume chain during the lifetime of the virtual machine. In some implementations, making the previous volume read-only (e.g., responsive to receiving a command via an administrative interface) triggers adding of a new COW volume.

Parent image selection module 322 may access the data of the virtual machine and identify a corresponding image from an image repository that will function as parent image 336. Parent image 336 may be a template image that is pre-built and may be identical to a base image or may be a modified version of a base image. The base image may be publically available and may correspond directly to a particular operating system (e.g., Fedora®, Windows®, Mac®). Parent image selection module 322 may attempt to select a parent image that corresponds directly to the operating system of the virtual machine or may select a base image that is a variation of the operating system. The variation may be an earlier version, the same version, or a later version of the operating system of the virtual machine and may include one or more enhancements (e.g., security or performance modifications). The variation may be based on a version of the operating system that includes more or less features and may execute on the same or different hardware architecture. In some examples, the variation selected by parent image selection module 322 may satisfy or may not satisfy the links discussed above in regards to the candidate service processes. Whether the variation satisfies or does not satisfy the links may be stored as feedback for use when selecting another parent images for the current target virtual machine or for another virtual machine.

Image updating module 324 may access parent image 336 and may update the parent image 336 to create a container image 132 that includes the one or more services of the virtual machine. Creating container image 132 may involve one or more operations that copy the computer code of one or more processes of a service into container image 132. In one example, image updating module 324 may copy the computer code from a version management control application (e.g., GIT) by executing RUN GIT clone path/to/src.git. In another example, the computer code may be copied using an operating system copy operation. In yet another example, the computer code may be made accessible to the container without executing a copy operation by mounting the storage location of the computer code. This may be the same location used by the virtual machine to access the computer code.

Image updating module 324 may generate or use a build file to update or create container image 132. Each container image may be associated with a build file and the build file may be referred to as an instruction file, an assembly file, a docker file, other file, or a combination thereof. The build file may include textual data, binary data, other data, or a combination thereof. In one example, the build file may be a text document that contains instructions (e.g., command line commands) that are interpreted by a container image creation service (e.g., docker service) to assemble a container image. Each instruction may correspond to a layer that will be associated with or included within the container image.

Layer optimization module 326 may modify the build file or container image 132 to update the number and content of one or more of the layers. The layers enable multiple images that inherit from the same parent image to share many of the same filesystem objects (e.g., files, directories, packages, libraries). This may reduce the total amount of computing resources (e.g., storage resources) consumed by the operating system level virtualization when running multiple containers that share layers. The reduction of computing resources may be accomplished by avoiding the need for multiple copies of the same layer to be loaded.

Layer optimization module 326 may analyze and classify content of the virtual machine to decompose the filesystem of the virtual machine into a set of one or more layers that represent the original filesystem. Decomposing the filesystem of the virtual machine may involve one or more comparisons between the filesystem objects present on the virtual machine and the content of the parent image. As discussed above, the container image 132 may include index data (e.g., digest) of the filesystem objects associated with the parent or base container image. The decomposition may involve comparing the index data of container image 132 with filesystem objects present on the virtual machine. The comparison may involve comparing index data and filesystem data (e.g., file names and checksums) of the virtual machine and container image 132 with or without comparing content of the individual files. For example, a base container image may include an index of the filesystem objects present in an operating system providing the operating system level virtualization without actually containing the filesystem objects (e.g., index includes name but not content of kernel library).

The decomposition may also or alternatively involve one or more filesystem utilities for transferring or synchronizing files across filesystems. The filesystem utility may use any filesystem data such as index data, filesystem object metadata, file object content data, other data, or a combination thereof to identify content that is missing from a filesystem (e.g., container layer of filesystem). In one example, the filesystem utility may also function as a backup tool and may be the same or similar to rsync, rdiffdir, other filesystem program, or a combination thereof.

Layer optimization module 326 may access data of link detection module 318 to detect links (e.g., dependencies) associated with a container image. In one example, layer optimization module 326 may generate multiple layers for a particular container image and some of the layers may have dependencies. When a container is initialized in view of the container image, each layer may be loaded and when a layer is loaded the links may be analyzed and the linked data (e.g., dependent packages) may also be loaded. In some situations, multiple different layers of a container image may include the same dependency and a container may load multiple instances of the same dependency. To avoid loading multiple instances, layer optimization module 326 may modify the build file, container image, layer data, or a combination thereof to remove duplicate links (e.g., dependencies) for layers associated with the same container. For example, a container image may be associated with multiple layers and the first layer may include dependency A, B, and C and the second layer may include dependency B, C, and D. When the container image is initiated the operating system virtualizer may load the first layer and each of the dependencies A, B, and C. The operating system virtualizer may then load the second layer and again load dependency B and C along with dependency D. Having multiple instances of dependency B and C may be in inefficient (e.g., larger storage footprint). To optimize the layering, layer optimization module 326 may modify the build file, container image, or layer data to cause dependency B and C to be loaded once and therefor may avoid dependency B and C from being reloaded for the second layer in which case the second layer may access the dependency loaded via the first layer.

Image registering module 328 may store the updated container image and one or more build files on a storage device. The storage device may be an image repository that is accessible to a node that provides operating system level virtualization. Image registering module 328 may also update an image registry with information associated with the container image such as one or more build files, locations, other data, or a combination thereof. The data of the image registry may be used to subsequently initiate the execution of the container image on a computing device comprising operating system level virtualization.

Figure 4:
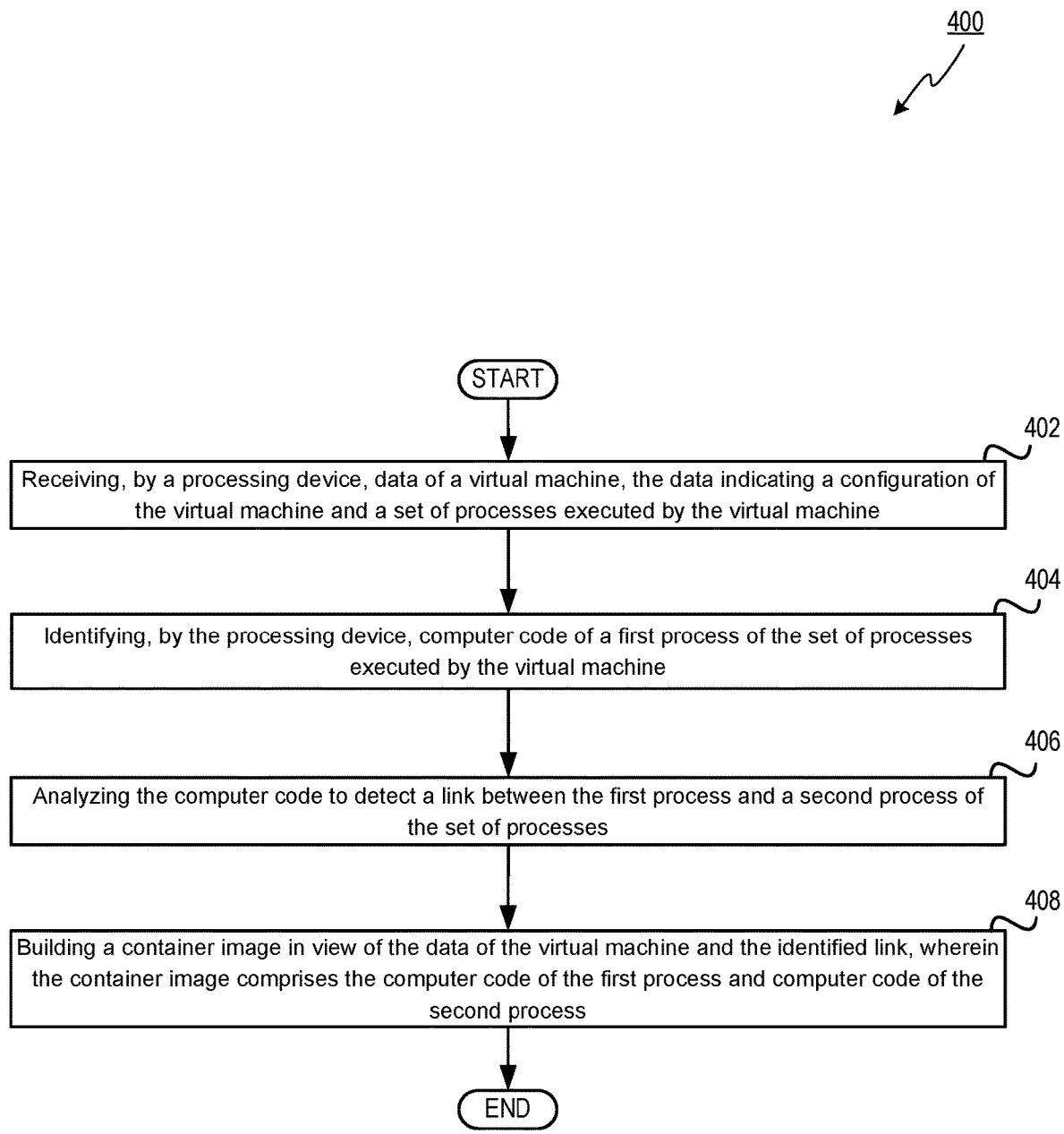
FIG. 4 depicts a flow diagram of an example method for converting services executed by a virtual machine to one or more container images, in accordance with one or more aspects of the present disclosure.
Figure 5:
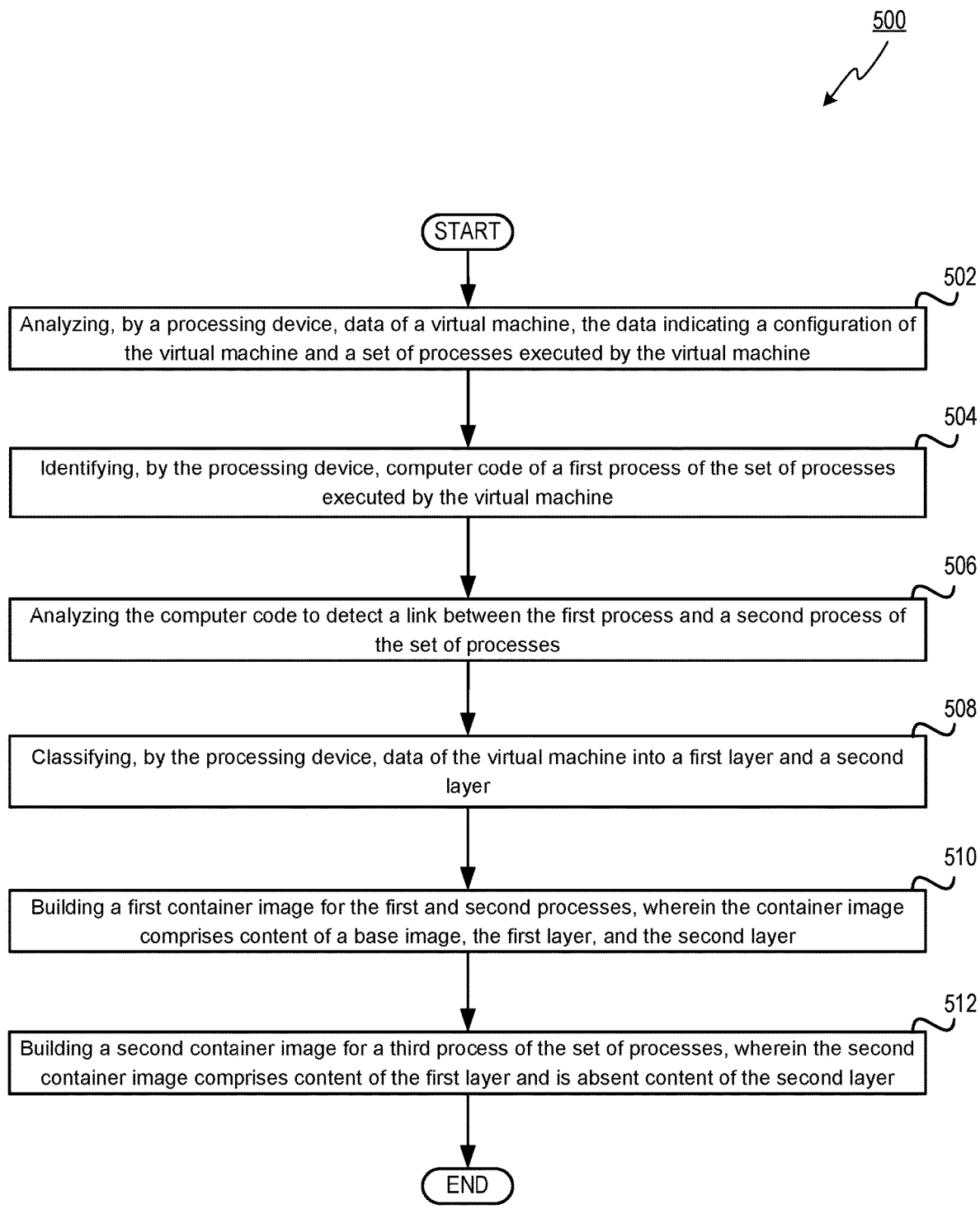
FIG. 5 depicts a flow diagram of another example method for converting services executed by a virtual machine to multiple container images with different layers, in accordance with one or more aspects of the present disclosure.

FIGS. 4 and 5 depict flow diagrams for illustrative examples of methods 400 and 500 for converting services from being a virtual machine to one or more containers. Method 400 illustrates an example process flow for creating a container image and method 500 is an example process flow from creating multiple container images based on different layers. Methods 400 and 500 may be performed by processing devices that may comprise hardware (e.g., circuitry, dedicated logic, programmable logic, microcode, etc.), executable code (such as is run on a general purpose computer system or a dedicated machine), or a combination of both. Methods 400 and 500 and each of their individual functions, routines, subroutines, or operations may be performed by one or more processors of the computer device executing the method. In certain implementations, methods 400 and 500 may each be performed by a single processing thread. Alternatively, methods 400 and 500 may be performed by two or more processing threads, each thread executing one or more individual functions, routines, subroutines, or operations of the method. In an illustrative example, the processing threads implementing methods 400 and 500 may be synchronized (e.g., using semaphores, critical sections, and/or other thread synchronization mechanisms). Alternatively, the processes implementing methods 400 and 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 400 and 500 may be performed by virtual machine analysis component 112 and container building component 114 as shown in FIGS. 1 and 3.

Referring to FIG. 4, method 400 may be performed by processing devices of a server device or a client device and may begin at block 402. At block 402, the processing device may receive data of a virtual machine and the data may indicate a configuration of the virtual machine and a set of processes executed by the virtual machine. The set of processes may include one or more of a web server process, a database process, a filesystem process, a user authentication process, an electronic mail process, other process, or a combination thereof. The configuration of a virtual machine may be associated with or related to data of the guest operating system, running processes, filesystem, other data, or a combination thereof. The data may include operational data that relates to an operational state of the virtual machine and one or more processes or may relate to non-operational data such as virtual machine or guest operating system settings. The data may include persistent data (e.g., non-ephemeral data) or transient data (e.g., ephemeral data), which may correspond to programs while they are being executed and may cease to exist when the programs are shut down.

At block 404, the processing device may identify computer code of a first process of the set of processes executed by the virtual machine. The computer code may include any code associated with one or more of the processes and may include source code, executable code, other code, or a combination thereof. The source code may include human readable computer code that is in a textual form. The source code may be subsequently compiled, linked, interpreted, other action, or a combination thereof prior to being executed by the virtual machine or within a container. The executable code may include machine-readable code that can be directly executed by a computing device (e.g., machine code) or indirectly executed by a machine (e.g., intermediate code, bytecode). Identifying the computer code may be performed in view of the configuration data received from an agent running on the virtual machine. In one example, the configuration data may include some or all of the computer code. In another example, the configuration data may indicate a location where some or all of the computer code is accessible (e.g., storage location). The location may be local to the virtual machine (e.g., on same physical device) or may be remote from the virtual machine on a storage device that is accessible over a network.

At block 406, the processing device may analyze the computer code to detect a link between the first process and a second process of the set of processes. Analyzing the computer code to detect a link may involve detecting a dependency, an inter-process communication, or shared memory between the first process and the second process. In one example, analyzing the computer code may involve accessing a storage location comprising the computer code of the first process. The computer code at the storage location may include the source code, executable code, or a combination thereof. The processing device may inspect the computer code of the first process and the computer code of one or more other processes to identify one or more links. The one or more links may include a runtime execution dependency between the first process and the second process. In another example, detecting a link may involve detecting an inter-processes communication between the first process and another process of the set of processes executed by the virtual machine.

At block 408, the processing device may build a container image in view of the data of the virtual machine and the identified link. Building the container image may involve building a plurality of container images that collectively comprise the set of processes executed by the virtual machine. The container image may include the computer code of the first process and computer code of the second process and may enable the computer code of the first process and second process to execute within a container using operating system level virtualization. Building the container image may involve selecting a parent container image in view of the configuration of the virtual machine. The parent container image may include a base image corresponding to a guest operating system of the virtual machine. In one example, the processing device may copy the parent container image from a public repository comprising a plurality of container images and may modify the parent container image to comprise the computer code of the first process. The computer code of the first process may be under development and may be loaded into a container for debugging purposes, testing purposes, or a combination thereof. After building the container image, the processing device may store the container image on a storage device accessible over a network. The processing device may also or alternatively register the container image with a repository comprising a plurality of container images. The processing device may or may not initiate execution of the container image on a computing device comprising operating system level virtualization. Responsive to completing the operations described herein above with references to block 408, the method may terminate.

Alternate examples of method 400 may also involve the processing device installing an agent on a first computing device (e.g., node) that executes the virtual machine. The agent may run as a portion of one or more of the guest operating system, the virtual machine, a hypervisor, or a host operating system of the first computing device. The processing device may initiate, over the computer network, the agent on the virtual machine to inspect the configuration of the virtual machine. The processing device may be a part of a second computing device and may receive data from the agent executing on the first computing device, wherein the first computing device and second computing device are separated by a computer network. In one example, the virtual machine may be managed by a hypervisor executing on a physical machine, and the data indicating the configuration of the virtual machine and the set of processes may be obtained during execution of the virtual machine. In another example, the data indicating the configuration of the virtual machine and the set of processes may be obtained from a virtual disk image of the virtual machine while the virtual machine is dormant.

Referring to FIG. 5, method 500 may be performed by processing devices of a server device or a client device and may begin at block 502. At block 502, the processing device may analyze data of a virtual machine and the data may indicate a configuration of the virtual machine and a set of processes executed by the virtual machine. The set of processes may include one or more of a web server process, a database process, a filesystem process, a user authentication process, an electronic mail process, other process, or a combination thereof. The configuration of a virtual machine may be associated with or related to data of the guest operating system, running processes, filesystem, other data, or a combination thereof. The data may include operational data that relates to an operational state of the virtual machine and one or more processes or may relate to non-operational data such as virtual machine or guest operating system settings. The data may include persistent data (e.g., non-ephemeral data) or transient data (e.g., ephemeral data), which may correspond to programs while they are being executed and may cease to exist when the programs are shut down.

At block 504, the processing device may identify computer code of a first process of the set of processes executed by the virtual machine. The computer code may include any code associated with one or more of the processes and may include source code, executable code, other code, or a combination thereof. The source code may include human readable computer code that is in a textual form. The source code may be subsequently compiled, linked, interpreted, other action, or a combination thereof prior to being executed by the virtual machine or within a container. The executable code may include machine-readable code that can be directly executed by a computing device (e.g., machine code) or indirectly executed by a machine (e.g., intermediate code, bytecode). Identifying the computer code may be performed in view of the configuration data received from an agent running on the virtual machine. In one example, the configuration data may include some or all of the computer code. In another example, the configuration data may indicate a location where some or all of the computer code is accessible (e.g., storage location). The location may be local to the virtual machine (e.g., on same physical device) or may be remote from the virtual machine on a storage device that is accessible over a network.

At block 506, the processing device may analyze the computer code to detect a link between the first process and a second process of the set of processes. Analyzing the computer code to detect a link may involve detecting a dependency, an inter-process communication, or shared memory between the first process and the second process. In one example, analyzing the computer code may involve accessing a storage location comprising the computer code of the first process. The computer code at the storage location may include the source code, executable code, or a combination thereof. The processing device may inspect the computer code of the first process and the computer code of one or more other processes to identify one or more links. The one or more links may include a runtime execution dependency between the first process and the second process. In another example, detecting a link may involve detecting an inter-processes communication between the first process and another process of the set of processes executed by the virtual machine.

At block 508, the processing device may classify data (e.g., content) of the virtual machine into a first layer and a second layer in view of the identified link. The first layer may include content common to the set of processes executed by the virtual machine and the second layer may include content specific to the first and second processes. Classifying content may include any of the features discussed above, such as the features discussed in regards to layer optimization module 326 and link detection module 318. Classifying content may involve decomposing the filesystem of the virtual machine and may involve one or more comparisons to identify which portions of the virtual machine include content that should be included within the container images and which content should be in which layers.

At block 510, the processing device may build a first container image for the first and second processes. The first container image may include content of a base image, the first layer, and the second layer. The container image may include the computer code of the first process and computer code of the second process and may enable the computer code of the first process and second process to execute within a container using operating system level virtualization. Building the container image may involve selecting a parent container image in view of the configuration of the virtual machine. The parent container image may include a base image corresponding to a guest operating system of the virtual machine. In one example, the processing device may copy the parent container image from a public repository comprising a plurality of container images and may modify the parent container image to comprise the computer code of the first process. The computer code of the first process may be under test or development and may be loaded into a container for debugging purposes, testing purposes, or a combination thereof. After building the container image, the processing device may store the container image on a storage device accessible over a network. The processing device may also or alternatively register the container image with a repository comprising a plurality of container images. The processing device may or may not initiate execution of the container image on a computing device comprising operating system level virtualization.

At block 512, the processing device may build a second container image for a third process of the set of processes. The second container image may include content of the first layer and may be absent content of the second layer. The first container image and/or the second container image may be built in view of the data of the virtual machine and one or more identified links. Responsive to completing the operations described herein above with references to block 512, the method may terminate.

Figure 6:
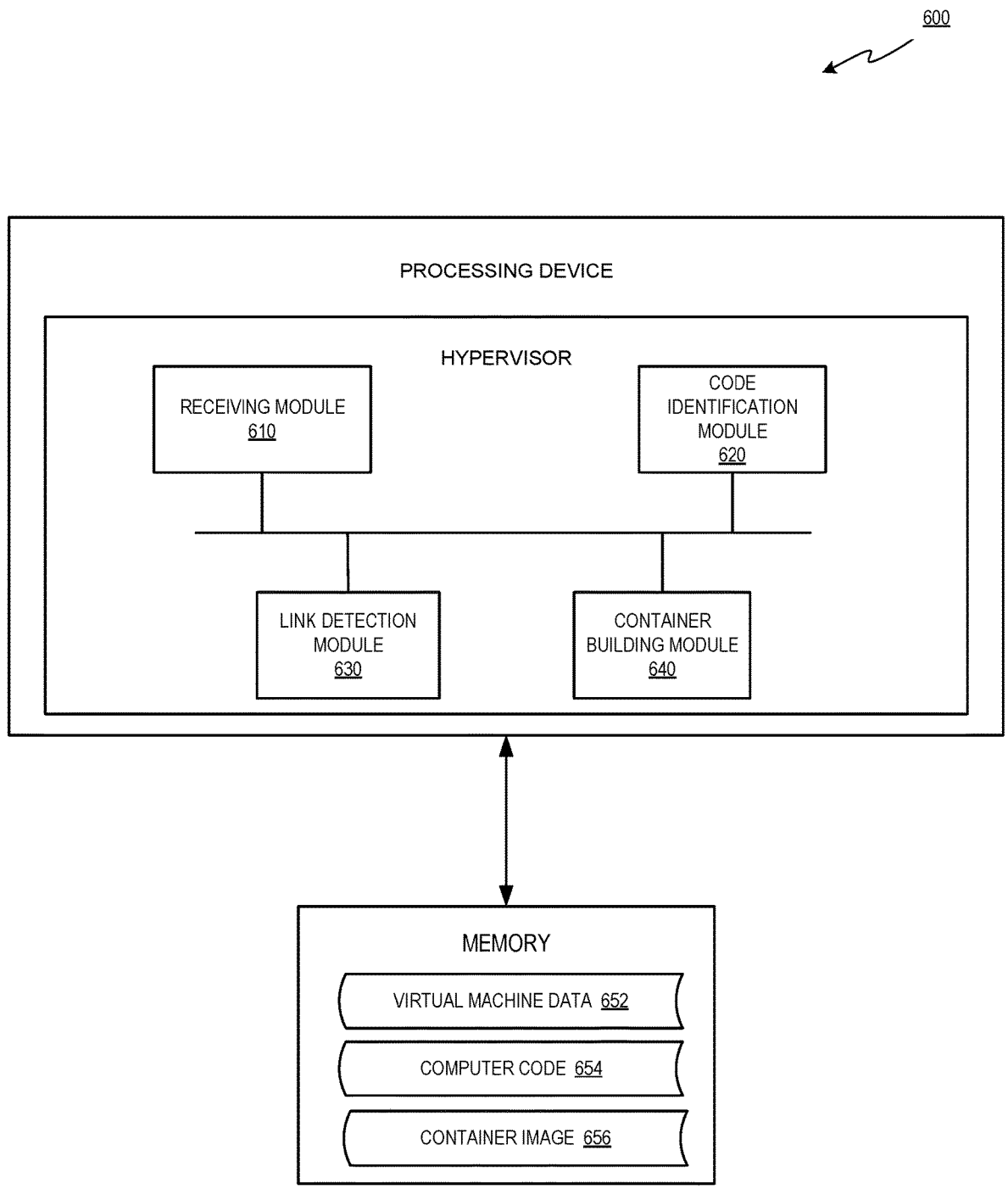
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 may be the same or similar to computer device 800 and may include one or more processing devices and one or more memory devices. In the example shown, computer system 600 may include a receiving module 610, a code identification module 620, a link detection module 630, and a container building module 640.

Receiving module 610 may enable a processing device to receive virtual machine data 652, which may indicate a configuration of the virtual machine and a set of processes executed by the virtual machine. The set of processes may include one or more of a web server process, a database process, a filesystem process, a user authentication process, an electronic mail process, other process, or a combination thereof. The configuration of a virtual machine may be associated with or related to data of the guest operating system, running processes, filesystem, other data, or a combination thereof. The data may include operational data that relates to an operational state of the virtual machine and one or more processes or may relate to non-operational data such as virtual machine or guest operating system settings. The data may include persistent data (e.g., non-ephemeral data) or transient data (e.g., ephemeral data), which may correspond to programs while they are being executed and may cease to exist when the programs are shut down.

Code identification module 620 may enable the processing device to identify computer code 654 of a first process of the set of processes executed by the virtual machine. Computer code 654 may include any code associated with one or more of the processes and may include source code, executable code, other code, or a combination thereof. The source code may include human readable computer code that is in a textual form. The source code may be subsequently compiled, linked, interpreted, other action, or a combination thereof prior to being executed by the virtual machine or within a container. The executable code may include machine-readable code that can be directly executed by a computing device (e.g., machine code) or indirectly executed by a machine (e.g., intermediate code, bytecode). Identifying computer code 654 may be performed in view of the configuration data received from an agent running on the virtual machine. In one example, the configuration data may include some or all of computer code 654. In another example, the configuration data may indicate a location where some or all of computer code 654 is accessible (e.g., storage location). The location may be local to the virtual machine (e.g., on same physical device) or may be remote from the virtual machine on a storage device that is accessible over a network.

Link detection module 630 may enable the processing device to analyze computer code 654 to detect a link between the first process and a second process of the set of processes. Analyzing computer code 654 to detect a link may involve detecting a dependency, an inter-process communication, or shared memory between the first process and the second process. In one example, analyzing computer code 654 may involve accessing a storage location comprising computer code 654 of the first process. The computer code at the storage location may include the source code, executable code, or a combination thereof. The processing device may inspect the computer code of the first process and the computer code of one or more other processes to identify one or more links. The one or more links may include a runtime execution dependency between the first process and the second process. In another example, detecting a link may involve detecting an inter-processes communication between the first process and another process of the set of processes executed by the virtual machine.

Container building module 640 may enable the processing device to build a container image 656 in view of the virtual machine data 652 and the identified link. Building container image 656 may involve building a plurality of container images that collectively comprise the set of processes executed by the virtual machine. Container image 656 may include computer code 654 of the first process and computer code of the second process and may enable the computer code of the first and second processes to execute within a container using operating system level virtualization. Building container image 656 may involve selecting a parent container image in view of the configuration of the virtual machine.

The parent container image may include a base image corresponding to a guest operating system of the virtual machine. In one example, the processing device may copy the parent container image from a public repository comprising a plurality of container images and may modify the parent container image to comprise the computer code of the first process. The computer code of the first process may be under development and may be loaded into a container for debugging purposes, testing purposes, or a combination thereof. After building the container image, the processing device may store the container image on a storage device accessible over a network. The processing device may also or alternatively register the container image with a repository comprising a plurality of container images. The processing device may or may not initiate execution of the container image on a computing device comprising operating system level virtualization.

Figure 7:
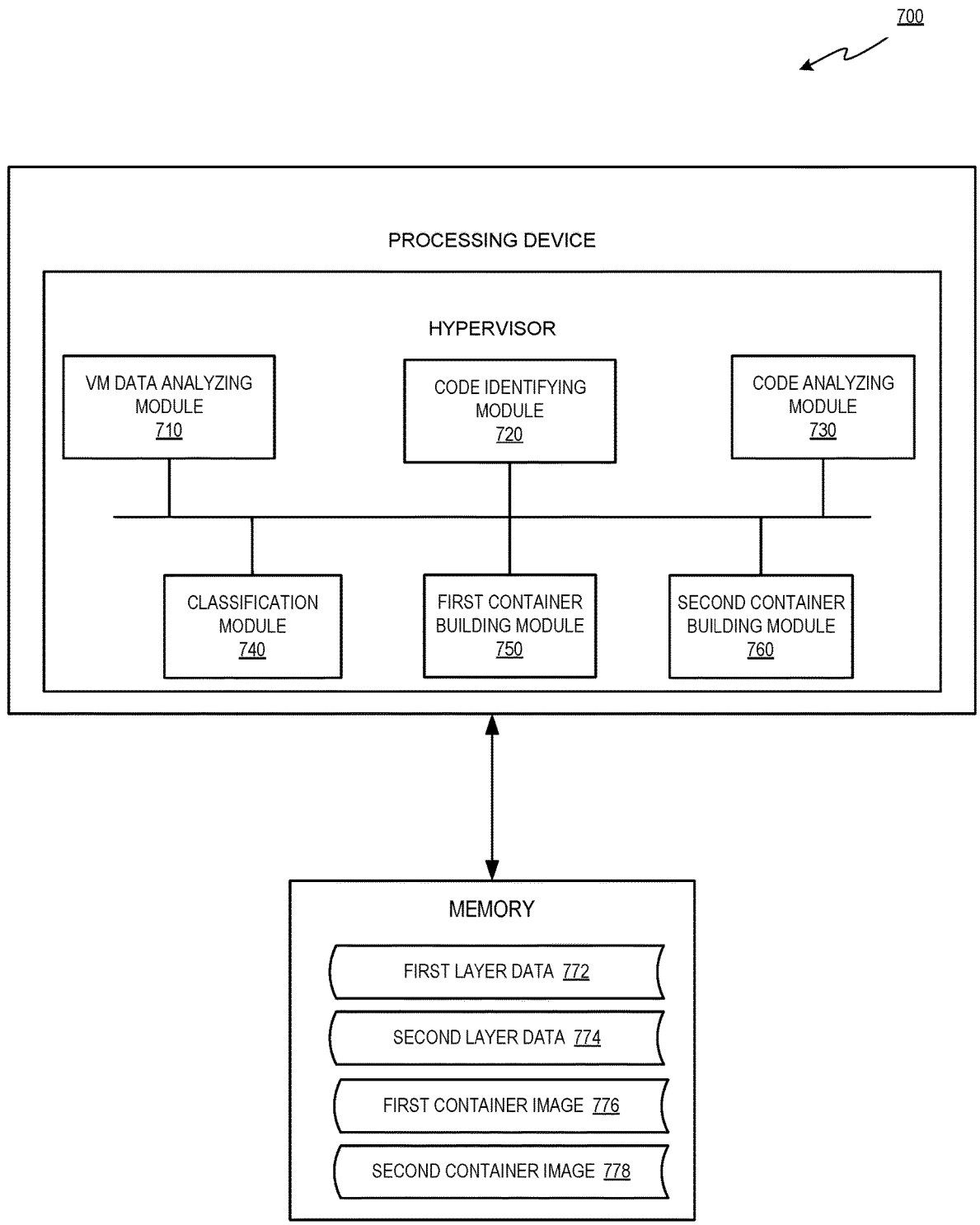
FIG. 7 depicts a block diagram of another example computer system in accordance with one or more aspects of the present disclosure.

FIG. 7 depicts a block diagram of a computer system 700 operating in accordance with one or more aspects of the present disclosure. Computer system 700 may be the same or similar to computer system 800 and may include one or more processing devices and one or more memory devices. In the example shown, computer system 700 may include a VM data analyzing module 710, a code identification module 720, a code analysis module 730, a classification module 740, a first container building module 750, and a second container building module 760.

VM data analyzing module 710 may enable a processing device to analyze data of a virtual machine and the data may indicate a configuration of the virtual machine and a set of processes executed by the virtual machine. The set of processes may include one or more of a web server process, a database process, a filesystem process, a user authentication process, an electronic mail process, other process, or a combination thereof. The configuration of a virtual machine may be associated with or related to data of the guest operating system, running processes, filesystem, other data, or a combination thereof. The data may include operational data that relates to an operational state of the virtual machine and one or more processes or may relate to non-operational data such as virtual machine or guest operating system settings. The data may include persistent data (e.g., non-ephemeral data) or transient data (e.g., ephemeral data), which may correspond to programs while they are being executed and may cease to exist when the programs are shut down.

Code identification module 720 may enable the processing device to identify computer code of a first process of the set of processes executed by the virtual machine. The computer code may include any code associated with one or more of the processes and may include source code, executable code, other code, or a combination thereof. The source code may include human readable computer code that is in a textual form. The source code may be subsequently compiled, linked, interpreted, other action, or a combination thereof prior to being executed by the virtual machine or within a container. The executable code may include machine-readable code that can be directly executed by a computing device (e.g., machine code) or indirectly executed by a machine (e.g., intermediate code, bytecode). Identifying the computer code may be performed in view of the configuration data received from an agent running on the virtual machine. In one example, the configuration data may include some or all of the computer code. In another example, the configuration data may indicate a location where some or all of the computer code is accessible (e.g., storage location). The location may be local to the virtual machine (e.g., on same physical device) or may be remote from the virtual machine on a storage device that is accessible over a network.

Code analysis module 730 may enable the processing device to analyze the computer code to detect a link between the first process and a second process of the set of processes. Analyzing the computer code to detect a link may involve detecting a dependency, an inter-process communication, or shared memory between the first process and the second process. In one example, analyzing the computer code may involve accessing a storage location comprising the computer code of the first process. The computer code at the storage location may include the source code, executable code, or a combination thereof. The processing device may inspect the computer code of the first process and the computer code of one or more other processes to identify one or more links. The one or more links may include a runtime execution dependency between the first process and the second process. In another example, detecting a link may involve detecting an inter-processes communication between the first process and another process of the set of processes executed by the virtual machine.

Classification module 740 may enable the processing device to classify data (e.g., content) of the virtual machine into a first layer and a second layer in view of the identified link. The first layer may include content (e.g., first layer data 772) common to the set of processes executed by the virtual machine and the second layer may include content (e.g., second layer data 774) specific to the first and second processes. Classifying content may include any of the features discussed above, such as the features discussed in regards to layer optimization module 326 and link detection module 318. Classifying content may involve decomposing the filesystem of the virtual machine and may involve one or more comparisons to identify which portions of the virtual machine include content that should be included within the container images and which content should be in which layers.

First container building module 750 may enable the processing device to build a first container image 776 for the first and second processes. First container image 776 may include content of a base image, the first layer, and the second layer. The container image may include the computer code of the first process and computer code of the second process and may enable the computer code of the first process and second process to execute within a container using operating system level virtualization. Building the container image may involve selecting a parent container image in view of the configuration of the virtual machine. The parent container image may include a base image corresponding to a guest operating system of the virtual machine. In one example, the processing device may copy the parent container image from a public repository comprising a plurality of container images and may modify the parent container image to comprise the computer code of the first process. The computer code of the first process may be under test or development and may be loaded into a container for debugging purposes, testing purposes, or a combination thereof. After building the container image, the processing device may store the container image on a storage device accessible over a network. The processing device may also or alternatively register the container image with a repository comprising a plurality of container images. The processing device may or may not initiate execution of the container image on a computing device comprising operating system level virtualization.

Second container building module 760 may enable the processing device to build a second container image 778 for a third process of the set of processes. Second container image 778 may include content of the first layer and may be absent content of the second layer. The first container image and/or the second container image may be built in view of the data of the virtual machine and one or more identified links.

Figure 8:
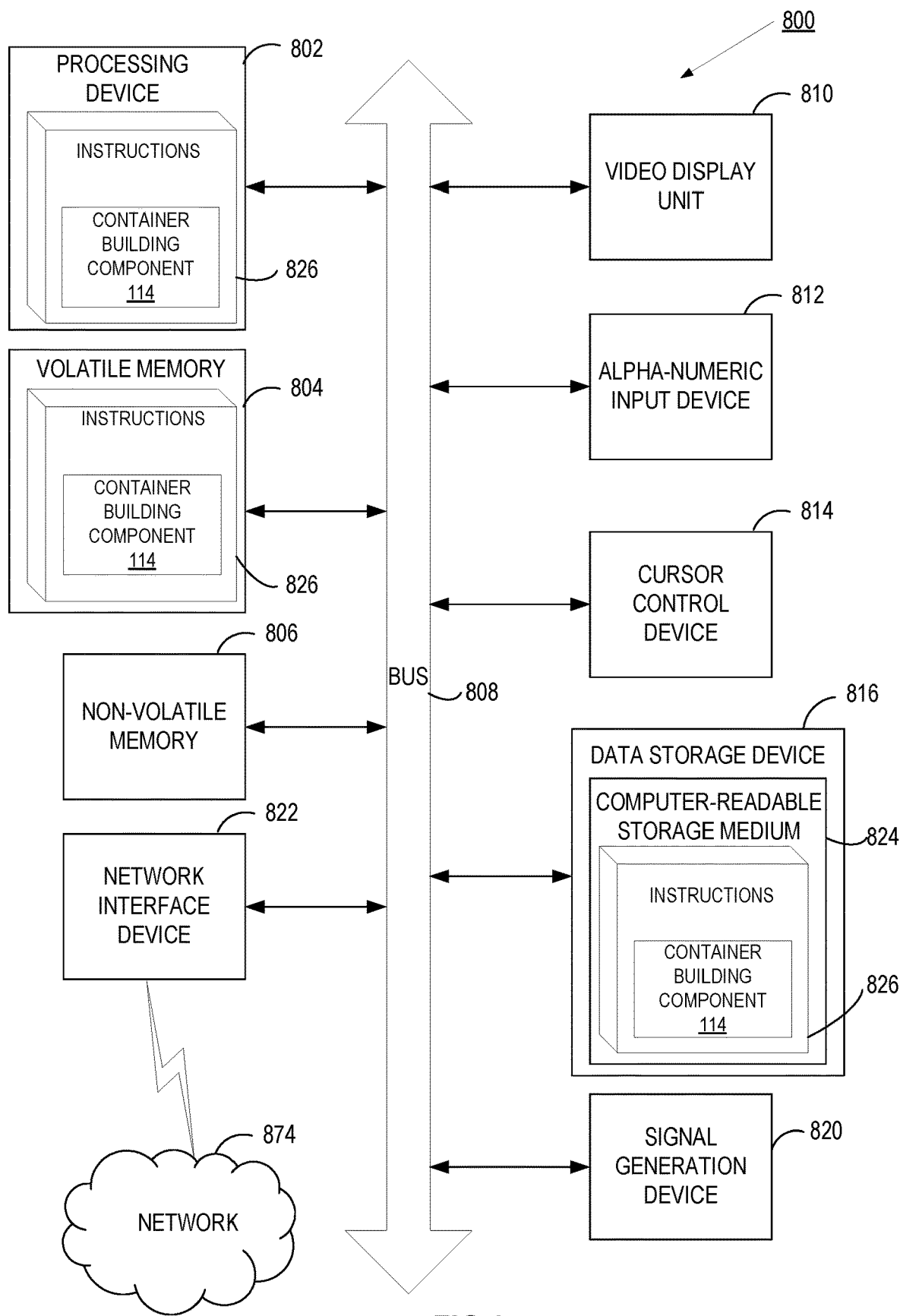
FIG. 8 depicts a block diagram of an illustrative computing device operating in accordance with the examples of the present disclosure.

FIG. 8 depicts a block diagram of a computer system operating in accordance with one or more aspects of the present disclosure. In various illustrative examples, computer system 800 may correspond to distributed system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 400 or 500 and for encoding virtual machine analysis component 112 and container building component 114 in FIGS. 1 and 3.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: receiving, by a processing device, data of a virtual machine, the data indicating a configuration of the virtual machine and a set of processes executed by the virtual machine; identifying, by the processing device, computer code of a first process of the set of processes executed by the virtual machine; analyzing the computer code to detect a link between the first process and a second process of the set of processes; and building a container image in view of the data of the virtual machine and the identified link, wherein the container image comprises the computer code of the first process and computer code of the second process.

Example 2 is a method of claim 1, wherein the container image enables the computer code of the first process to execute within a container using operating system level virtualization.

Example 3 is a method of claim 1, wherein the virtual machine is managed by a hypervisor executing on a physical machine, and wherein the data indicating the configuration of the virtual machine and the set of processes is obtained during execution of the virtual machine.

Example 4 is a method of claim 1, further comprising: initiating, by the processing device of a first computing device, the installation of an agent on a second computing device comprising the virtual machine, wherein the agent is installed into one or more of the guest operating system, a hypervisor, or a host operating system of the second computing device; and receiving, by the processing device of the first computing device, the data from the agent, wherein the first computing device and second computing device are separated by a computer network.

Example 5 is a method of claim 1, wherein the analyzing the computer code to detect a link comprises detecting a dependency, an inter-process communication, or shared memory between the first process and the second process.

Example 6 is a method of claim 1, wherein the analyzing the computer code comprises: identifying a storage location of the computer code of the first process, wherein the computer code at the storage location comprises source code or executable code of the first process; and inspecting the computer code of the first process and the computer code of the second process to identify one or more links, wherein the one or more links comprise a runtime execution dependency between the first process and the second process.

Example 7 is a method of claim 1, wherein the building the container image comprises building a plurality of container images that collectively comprise the set of processes executed by the virtual machine.

Example 8 is a method of claim 1, further comprising: classifying, by the processing device, content of the virtual machine into a first layer and a second layer, wherein the first layer comprises content common to the set of processes executed by the virtual machine and the second layer comprises content specific to the first and second processes; building a first container image for the first and second processes, wherein the container image comprises content of a base image, the first layer, and the second layer; and building a second container image for a third process of the set of processes, wherein the second container image comprises content of the first layer and is absent content of the second layer.

Example 9 is a method of claim 1, wherein the building the container image comprises: selecting, in view of the configuration of the virtual machine, a parent container image comprising a base image corresponding to a guest operating system of the virtual machine; and copying the parent container image from a public repository comprising a plurality of container images; modifying the parent container image to comprise the computer code of the first process, wherein the computer code of the first process is under development and being tested.

Example 10 is a method of claim 1, further comprising: storing the container image and a build file on a storage device accessible over a network; registering the container image with a repository comprising a plurality of container images; and initiating the execution of the container image on a computing device comprising operating system level virtualization.

Example 11 is a method of claim 1, wherein the set of processes comprises multiple services comprising one or more of a web server process, a database process, a file system process, a user authentication process, or an electronic mail process.

Example 12 is a method of claim 1, further comprising: detecting an inter-processes communication between the first process and a third process of the set of processes executed by the virtual machine; and modifying the container image to comprise computer code of the third process.

Example 13 is a system comprising: a memory; a processing device operatively coupled to the memory, the processing device to: receive data of a virtual machine, the data indicating a configuration of the virtual machine and a set of processes executed by the virtual machine; identify computer code of a first process of the set of processes executed by the virtual machine; analyze the computer code to detect a link between the first process and a second process of the set of processes; and build a container image in view of the data of the virtual machine and the identified link, wherein the container image comprises the computer code of the first process and computer code of the second process.

Example 14 is a system of claim 13, wherein the container image enables the computer code of the first process to execute within a container using operating system level virtualization.

Example 15 is a system of claim 13, wherein the virtual machine is managed by a hypervisor executing on a physical machine, and wherein the data indicating the configuration of the virtual machine and the set of processes is obtained during execution of the virtual machine.

Example 16 is a system of claim 13, wherein the processing device is further to: initiate, by the processing device of a first computing device, the installation of an agent on a second computing device comprising the virtual machine, wherein the agent is installed into one or more of the guest operating system, a hypervisor, or a host operating system of the second computing device; and receive, by the processing device of the first computing device, the data from the agent, wherein the first computing device and second computing device are separated by a computer network.

Example 17 is a system of claim 13, wherein to analyze the computer code to detect a link the processing device is to detect a dependency, an inter-process communication, or shared memory between the first process and the second process.

Example 18 is a system of claim 13, wherein to analyze the computer code the processing device is further to: identify a storage location of the computer code of the first process, wherein the computer code at the storage location comprises source code or executable code of the first process; and inspect the computer code of the first process and the computer code of the second process to identify one or more links, wherein the one or more links comprise a runtime execution dependency between the first process and the second process.

Example 19 is a system of claim 13, wherein to build the container image the processing device is to build a plurality of container images that collectively comprise the set of processes executed by the virtual machine.

Example 20 is a system of claim 13, wherein the processing device is further to: classify content of the virtual machine into a first layer and a second layer, wherein the first layer comprises content common to the set of processes executed by the virtual machine and the second layer comprises content specific to the first and second processes; build a first container image for the first and second processes, wherein the container image comprises content of a base image, the first layer, and the second layer; and build a second container image for a third process of the set of processes, wherein the second container image comprises content of the first layer and is absent content of the second layer.

Example 21 is a system of claim 13, wherein to build the container image the processing device is to: select, in view of the configuration of the virtual machine, a parent container image comprising a base image corresponding to a guest operating system of the virtual machine; and copying the parent container image from a public repository comprising a plurality of container images; modify the parent container image to comprise the computer code of the first process, wherein the computer code of the first process is under development and being tested.

Example 22 is a system of claim 13, wherein the processing device is further to: store the container image and a build file on a storage device accessible over a network; register the container image with a repository comprising a plurality of container images; and initiating the execution of the container image on a computing device comprising operating system level virtualization.

Example 23 is a system of claim 13, wherein the set of processes comprises multiple services comprising one or more of a web server process, a database process, a file system process, a user authentication process, or an electronic mail process.

Example 24 is a system of claim 13, wherein the processing device is further to: detect an inter-processes communication between the first process and a third process of the set of processes executed by the virtual machine; and modify the container image to comprise computer code of the third process.

Example 25 is a non-transitory machine-readable storage medium storing instructions that cause a processing device to: analyze data of a virtual machine, the data indicating a configuration of the virtual machine and a set of processes executed by the virtual machine; identify computer code of a first process of the set of processes executed by the virtual machine; analyzing the computer code to detect a link between the first process and a second process of the set of processes; classify data of the virtual machine into a first layer and a second layer in view of the identified link, wherein the first layer comprises content common to the set of processes executed by the virtual machine and the second layer comprises content specific to the first and second processes; build a first container image for the first and second processes, wherein the container image comprises content of a base image, the first layer, and the second layer; and build a second container image for a third process of the set of processes, wherein the second container image comprises content of the first layer and is absent content of the second layer.

Example 26 is a non-transitory machine-readable storage medium of claim 25, wherein the first container image enables the computer code of the first process to execute within a container using operating system level virtualization.

Example 27 is a non-transitory machine-readable storage medium of claim 25, wherein the virtual machine is managed by a hypervisor executing on a physical machine, and wherein the data indicating the configuration of the virtual machine and the set of processes is obtained during execution of the virtual machine.

Example 28 is a non-transitory machine-readable storage medium of claim 25, wherein the processing device is further to: initiate, by the processing device of a first computing device, the installation of an agent on a second computing device comprising the virtual machine, wherein the agent is installed into one or more of the guest operating system, a hypervisor, or a host operating system of the second computing device; and receive, by the processing device of the first computing device, the data from the agent, wherein the first computing device and second computing device are separated by a computer network.

Example 29 is a non-transitory machine-readable storage medium of claim 25, wherein to analyze the computer code to detect a link the processing device is to detect a dependency, an inter-process communication, or shared memory between the first process and the second process.

Example 30 is a non-transitory machine-readable storage medium of claim 25, wherein to analyze the computer code the processing device is to: identify a storage location of the computer code of the first process, wherein the computer code at the storage location comprises source code or executable code of the first process; and inspect the computer code of the first process and the computer code of the second process to identify one or more links, wherein the one or more links comprise a runtime execution dependency between the first process and the second process.

Example 31 is a non-transitory machine-readable storage medium of claim 25, wherein to build the first container image the processing device is to: select, in view of the configuration of the virtual machine, a parent container image comprising a base image corresponding to a guest operating system of the virtual machine; and copying the parent container image from a public repository comprising a plurality of container images; modify the parent container image to comprise the computer code of the first process, wherein the computer code of the first process is under development and being tested.

Example 32 is a non-transitory machine-readable storage medium of claim 25, wherein the processing device is further to: store the first and second container images and corresponding build files on a storage device accessible over a network; register the first and second container images with a repository comprising a plurality of container images; and initiate the execution of the first and second container images on a computing device comprising operating system level virtualization.

Example 33 is a non-transitory machine-readable storage medium of claim 25, wherein the set of processes comprises multiple services comprising one or more of a web server process, a database process, a file system process, a user authentication process, or an electronic mail process.

Example 34 is a non-transitory machine-readable storage medium of claim 25, wherein the processing device is further to: detect an inter-processes communication between the first process and a third process of the set of processes executed by the virtual machine; and modify the first container image to comprise computer code of the third process.

Example 35 is a system comprising: a memory; a processing device coupled to the memory, the processing device to: analyze data of a virtual machine, the data indicating a configuration of the virtual machine and a set of processes executed by the virtual machine; identify computer code of a first process of the set of processes executed by the virtual machine; analyzing the computer code to detect a link between the first process and a second process of the set of processes; classify data of the virtual machine into a first layer and a second layer in view of the identified link, wherein the first layer comprises content common to the set of processes executed by the virtual machine and the second layer comprises content specific to the first and second processes; build a first container image for the first and second processes, wherein the container image comprises content of a base image, the first layer, and the second layer; and build a second container image for a third process of the set of processes, wherein the second container image comprises content of the first layer and is absent content of the second layer.

Example 36 is an apparatus comprising: a means for receiving data of a virtual machine, the data indicating a configuration of the virtual machine and a set of processes executed by the virtual machine; a means for identifying computer code of a first process of the set of processes executed by the virtual machine; a means for analyzing the computer code to detect a link between the first process and a second process of the set of processes; and a means for building a container image in view of the data of the virtual machine and the identified link, wherein the container image comprises the computer code of the first process and computer code of the second process.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "analyzing," "selecting," "building," "classifying," "updating," "optimizing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a processing device, data of a virtual machine, the data indicating a configuration of the virtual machine and indicating a set of processes executed by the virtual machine, wherein the set of processes comprises a first process, a second process, and a third process;
analyzing computer code of the first process to detect a link between the first process and the second process;
classifying content of the virtual machine into a first layer and a second layer in view of the link, wherein the first layer comprises content common to the set of processes executed by the virtual machine and the second layer comprises content specific to the first and second processes; and
building a plurality of container images in view of the content of the virtual machine and the link, the plurality of container images comprising a first container image for the first and second processes and a second container image for the third process, wherein the first container image comprises content of the first layer and content of the second layer and wherein the second container image comprises content of the first layer and is absent the content of the second layer.

2. The method of claim 1, wherein the first container image enables the computer code of the first process and computer code of the second process to execute within a container using operating system level virtualization.

3. The method of claim 1, wherein the virtual machine is managed by a hypervisor executing on a physical machine, and wherein the data indicating the configuration of the virtual machine is obtained during execution of the virtual machine.

4. The method of claim 1, further comprising:
initiating, by the processing device of a first computing device, an installation of an agent on a second computing device that comprises the virtual machine, wherein the agent is installed into one or more of a guest operating system, a hypervisor, or a host operating system of the second computing device; and
receiving, by the processing device of the first computing device, the data from the agent, wherein the first computing device and the second computing device are separated by a computer network.

5. The method of claim 1, wherein the analyzing the computer code of the first process to detect the link comprises detecting a dependency, an inter-process communication, or shared memory between the first process and the second process.

6. The method of claim 1, wherein the analyzing the computer code of the first process comprises:
identifying a storage location of the computer code of the first process, wherein the computer code at the storage location comprises source code or executable code of the first process; and
inspecting the computer code of the first process and computer code of the second process to identify one or more links, wherein the one or more links comprise a runtime execution dependency between the first process and the second process.

7. The method of claim 1, wherein the building the plurality of container images comprises building a third container image comprising computer code of a fourth process of the set of processes executed by the virtual machine.

8. The method of claim 1, wherein: the
first container image for the first and second processes and the second container image for the third process each further comprise content of a base image.

9. The method of claim 1, wherein the building of the plurality of container images comprises:
selecting, in view of the configuration of the virtual machine, a parent container image comprising a base image corresponding to a guest operating system of the virtual machine;
copying the parent container image from a public repository comprising a plurality of container images; and
modifying the parent container image to comprise the computer code of a process of the set of processes, wherein the computer code of the process is under development and being tested.

10. The method of claim 1, further comprising:
storing the first container image and a build file on a repository accessible over a network, wherein the repository comprises multiple container images;
registering information of the first container image with the repository; and
initiating execution of the first container image on a computing device that comprising operating system level virtualization.

11. The method of claim 1, wherein the set of processes comprises multiple services comprising one or more of a web server process, a database process, a file system process, a user authentication process, or an electronic mail process.

12. The method of claim 1, further comprising:
detecting an inter-processes communication between the first process and a fourth process of the set of processes executed by the virtual machine; and
modifying the container image to comprise computer code of the fourth process.

13. A system comprising:
a memory;
a processing device operatively coupled to the memory, the processing device to:
receive data of a virtual machine, the data indicating a configuration of the virtual machine and indicating a set of processes executed by the virtual machine;
analyze computer code of the first process to detect a link between the first process and the second process;
classify content of the virtual machine into a first layer and a second layer in view of the link, wherein the first layer comprises content common to the set of processes executed by the virtual machine and the second layer comprises content specific to the first and second processes; and
build a plurality of container images in view of the content of the virtual machine and the link, the plurality of container images comprising a first container image for the first and second processes and a second container image for the third process, wherein the first container image comprises content of the first layer and content of the second layer and wherein the second container image comprises content of the first layer and is absent the content of the second layer.

14. The system of claim 13, wherein the first container image enables the computer code of the first process and computer code of the second container image to execute within a container using operating system level virtualization.

15. The system of claim 13, wherein the virtual machine is managed by a hypervisor executing on a physical machine, and wherein the data indicating the configuration of the virtual machine is obtained during execution of the virtual machine.

16. The system of claim 13, wherein the processing device is further to:
initiate, by the processing device of a first computing device, an installation of an agent on a second computing device that comprises the virtual machine, wherein the agent is installed into one or more of a guest operating system, a hypervisor, or a host operating system of the second computing device; and
receive, by the processing device of the first computing device, the data from the agent, wherein the first computing device and the second computing device are separated by a computer network.

17. A non-transitory machine-readable storage medium storing instructions which, when executed, cause a processing device to perform operations comprising:
analyzing data of a virtual machine, the data indicating a configuration of the virtual machine and indicating a set of processes executed by the virtual machine;
identifying computer code of a first process of the set of processes executed by the virtual machine;
analyzing the computer code to detect a link between the first process and a second process of the set of processes;
classifying content of the virtual machine into a first layer and a second layer in view of the link, wherein the first layer comprises content common to the set of processes executed by the virtual machine and the second layer comprises content specific to the first and second processes;
building a first container image for the first and second processes, wherein the first container image comprises content of a base image, the first layer, and the second layer; and
building a second container image for a third process of the set of processes, wherein the second container image comprises content of the first layer and is absent content of the second layer.

18. The non-transitory machine-readable storage medium of claim 17, wherein the first container image enables the computer code of the first process and computer code of the second process to execute within a container using operating system level virtualization.

19. The non-transitory machine-readable storage medium of claim 17, wherein the virtual machine is managed by a hypervisor executing on a physical machine, and wherein the data indicating the configuration of the virtual machine is obtained during execution of the virtual machine.

20. The non-transitory machine-readable storage medium of claim 17, wherein the operations further comprise:
   initiating, by the processing device of a first computing device, an installation of an agent on a second computing device that comprises the virtual machine, wherein the agent is installed into one or more of a guest operating system, a hypervisor, or a host operating system of the second computing device; and
   receiving, by the processing device of the first computing device, the data of the virtual machine from the agent, wherein the first computing device and the second computing device are separated by a computer network.

* * * * *